United States Patent
Sasaki

(10) Patent No.: US 10,556,506 B2
(45) Date of Patent: Feb. 11, 2020

(54) TANK FIXING APPARATUS

(71) Applicant: TOYOTA JIDOSHA KABUSHIKI KAISHA, Toyota-shi, Aichi-ken (JP)

(72) Inventor: Shigeru Sasaki, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/869,005

(22) Filed: Sep. 29, 2015

(65) Prior Publication Data
US 2016/0097487 A1 Apr. 7, 2016

(30) Foreign Application Priority Data

Oct. 1, 2014 (JP) .................................. 2014-203470

(51) Int. Cl.
*B60K 15/067* (2006.01)
*F17C 13/08* (2006.01)
*B60K 15/07* (2006.01)

(52) U.S. Cl.
CPC ............ *B60K 15/067* (2013.01); *B60K 15/07* (2013.01); *F17C 13/084* (2013.01); *F17C 2205/0196* (2013.01)

(58) Field of Classification Search
CPC .... F17C 13/083; F17C 13/084; F17C 13/085; F17C 2205/0153; F17C 2205/0157;
(Continued)

(56) References Cited

U.S. PATENT DOCUMENTS 4,770,378 A * 9/1988 Onishi .................. F16L 3/2235
248/68.1
6,042,071 A 3/2000 Watanabe et al.
(Continued)

FOREIGN PATENT DOCUMENTS

CA 2290259 A1 * 5/2001 ............. B60K 15/07
CN 102126428 A 7/2011
(Continued)

OTHER PUBLICATIONS

A machine translation of Kondo et al. (JP 2010-175001 A).*
(Continued)

*Primary Examiner* — Jonathan Liu
*Assistant Examiner* — Guang H Guan
(74) *Attorney, Agent, or Firm* — Hunton Andrews Kurth LLP

(57) ABSTRACT

A tank fixing apparatus includes: first and second bands adjacent to each other, each including a fixed portion fixed to a support member supporting a tank, a pressing portion extending from the fixed portion and pressing an outer periphery of the tank toward the support member, and a distal end portion extending from the pressing portion and not fixed to the support member; first and second fixing portions fixing the fixed portions of the first and second bands to the support member, respectively; and first and second urging portions urging the first and second bands to give pressing forces for the tank to the pressing portions of the first and second bands, respectively. A direction of the first band extending from the fixed portion to the distal end portion is opposite to a direction of the second band extending from the fixed portion to the distal end portion.

2 Claims, 7 Drawing Sheets

(58) Field of Classification Search
CPC ..... F17C 2205/0184; F17C 2205/0196; B60K 15/067; B60K 15/07
USPC ........ 280/830, 833, 834; 220/646, 647, 648, 220/562, 565; 410/97, 100; 248/499, 248/500, 505, 510, 146, 154, 201, 228.8, 248/230.8, 230.9, 313, 316.1, 74.2, 74.3
See application file for complete search history.

(56) References Cited

U.S. PATENT DOCUMENTS

| | | | | |
|---|---|---|---|---|
| 6,287,062 | B1 * | 9/2001 | Vallance | B60P 7/0823 410/100 |
| 6,557,814 | B1 * | 5/2003 | Rutz | B60K 15/07 248/503 |
| 6,944,026 | B2 * | 9/2005 | Lee | H01L 23/4093 165/185 |
| 7,264,277 | B2 * | 9/2007 | Ono | B60K 15/07 280/781 |
| 7,562,788 | B2 * | 7/2009 | Watanabe | B60K 15/07 220/562 |
| 8,366,152 | B2 * | 2/2013 | Tsubokawa | B60K 15/07 280/784 |
| 8,408,600 | B2 * | 4/2013 | Kondo | B60K 15/07 280/834 |
| 8,579,331 | B2 * | 11/2013 | Hayashi | B60K 15/07 248/230.1 |
| 9,083,031 | B2 * | 7/2015 | Bolden | H01M 2/1077 |
| 9,650,002 | B2 * | 5/2017 | Sasaki | B60R 16/08 |
| 2011/0174856 | A1 | 7/2011 | Hayashi et al. | |
| 2012/0056412 | A1 | 3/2012 | Kawamoto et al. | |
| 2015/0096977 | A1 * | 4/2015 | Sirosh | F02M 21/0221 220/4.14 |
| 2016/0096495 | A1 | 4/2016 | Sasaki | |
| 2016/0097487 | A1 * | 4/2016 | Sasaki | F17C 1/02 248/505 |

FOREIGN PATENT DOCUMENTS

| | | |
|---|---|---|
| JP | H10-278601 A | 10/1998 |
| JP | 2006-240463 A | 9/2006 |
| JP | 2010-175001 A | 8/2010 |
| JP | 2012051529 A | 3/2012 |
| JP | 2012-081807 A | 4/2012 |

OTHER PUBLICATIONS

Office Action issued to U.S. Appl. No. 14/872,630 dated Nov. 4, 2016.

US Patent and Trademark Office, Corrected Notice of Allowance in U.S. Appl. No. 14/872,630, dated Mar. 17, 2017, 6 pages.

Notice of Allowance dated Jan. 20, 2017 in U.S. Appl. No. 14/872,630.

* cited by examiner

TANK FIXING APPARATUS

INCORPORATION BY REFERENCE

The disclosure of Japanese Patent Application No. 2014-203470 filed on Oct. 1, 2014 including the specification, drawings and abstract is incorporated herein by reference in its entirety.

BACKGROUND OF THE INVENTION

1. Field of the Invention

The invention relates to a tank fixing apparatus.

2. Description of Related Art

For example, Japanese Patent Application Publication No. 2012-081807 discloses a technique for fixing a tank to a vehicle skeleton member by a plurality of bands. To be more specific, one end of each of the bands is fixed to the vehicle skeleton member, and the other end is urged toward the vehicle skeleton member by a coil spring, so that the tank is fixed to the vehicle skeleton member by the band.

The tank fixed to the vehicle skeleton member as described above is preferably prevented from rattling against the vehicle skeleton member when, for example, vibration or impact is applied to the vehicle skeleton member. It is thus preferable to urge the tank toward the vehicle skeleton member by the band by using an elastic body having a large urging force. However, the elastic body having a large urging force has a large size. Thus, a size of an entire apparatus may be increased by employing the elastic body having a large urging force as described above.

SUMMARY OF THE INVENTION

The invention provides a tank fixing apparatus in which an increase in size is suppressed.

The above object can be achieved by a tank fixing apparatus including: a first band and a second band adjacent to each other, each including a fixed portion that is fixed to a support member that supports a tank, a pressing portion that extends from the fixed portion and presses an outer periphery of the tank toward the support member, and a distal end portion that extends from the pressing portion and is not fixed to the support member; a first fixing portion and a second fixing portion that fix the fixed portions of the first and second bands to the support member, respectively; and a first urging portion and a second urging portion that urge the first and second bands so as to give pressing forces for the tank to the pressing portions of the first and second bands, respectively. A direction of the first band extending from the fixed portion to the distal end portion is opposite to a direction of the second band extending from the fixed portion to the distal end portion.

When a force for separating the tank from the support member is applied to the tank against the pressing force from each of the bands, the distal end portion of each of the bands attempts to swing about a position on the fixed portion side, and the tank attempts to rotate in a direction from the fixed portion to the distal end portion along an inner surface of the pressing portion of each of the bands. However, a direction of the first band extending from the fixed portion to the distal end portion is opposite to a direction of the second band extending from the fixed portion to the distal end portion. Therefore, directions in which the first and second bands attempt to swing are opposite to each other. As a result, a rotational direction of the tank due to the swing of the first band and a rotational direction of the tank due to the swing of the second band are opposite to each other. Thus, even when the force for separating the tank from the support member is applied to the tank, the rotation of the tank is suppressed. In order that the tank may separate from the support member in a state in which the rotation of the tank is suppressed as described above, a force exceeding static friction forces generated between the tank and the pressing portion of the first band and between the tank and the pressing portion of the second band needs to be applied to the tank to cause the tank to slide on the first and second bands. The static friction forces are generated between the tank, the rotation of which is suppressed, and the first and second bands as described above, so that rattling of the tank against the support member is suppressed. Therefore, the rattling of the tank can be suppressed without increasing urging forces of the first and second urging portions that urge the first and second bands, respectively. Consequently, an increase in size of the first and second urging portions is suppressed, and an increase in size of the tank fixing apparatus can be also suppressed.

The pressing portions of the first and second bands may press the tank between the pressing portions and the support member, the distal end portions of the first and second bands may be located opposite to each other across the tank, the fixed portions of the first and second bands may be located opposite to each other across the tank, the fixed portion and the distal end portion of the first band may be located opposite to each other across the tank, and the fixed portion and the distal end portion of the second band may be located opposite to each other across the tank.

The fixed portions and the pressing portions of the first and second bands may be wound around the outer periphery of the tank, and the fixed portions of the first and second bands may be located on the same side with respect to the tank.

According to the invention, the tank fixing apparatus in which the increase in size is suppressed can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, modes for carrying out the invention will be described based on embodiments.

Figure 1:
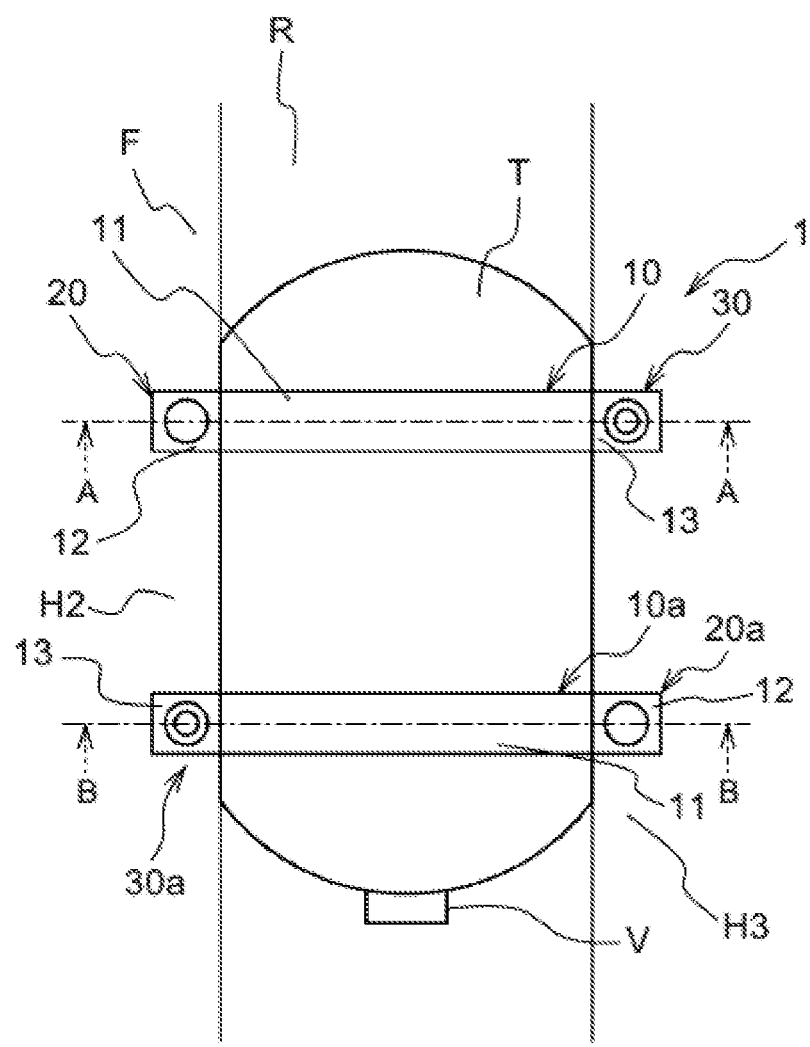
FIG. 1 is an upper view of a fixing apparatus of a first embodiment mounted in a vehicle.
Figure 2:
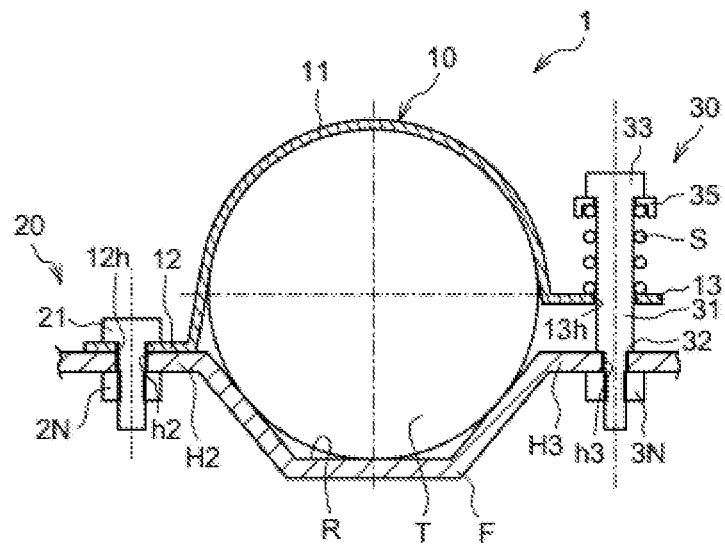
FIG. 2 is a cross-sectional view along A-A in FIG. 1.
Figure 3:
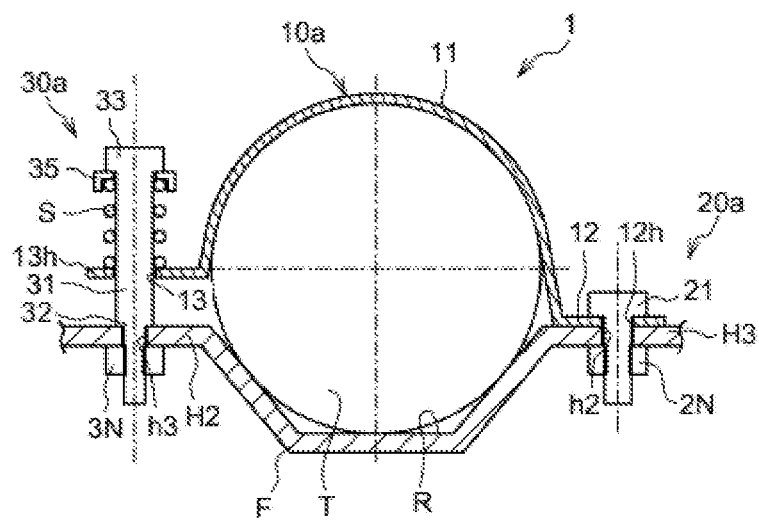
FIG. 3 is a cross-sectional view along B-B in FIG. 1.

FIG. 1 is an upper view of a fixing apparatus 1 of a first embodiment. FIG. 2 is a cross-sectional view along A-A in FIG. 1. FIG. 3 is a cross-sectional view along B-B in FIG. 1. The fixing apparatus 1 includes bands 10, 10 a, fixing mechanisms 20, 20 a, and urging mechanisms 30, 30 a. Note that the fixing mechanism 20 and the urging mechanism 30 are omitted in FIG. 3. A tank T is accommodated in a recessed portion R that is formed in an upper surface of a platform F of a vehicle (not shown) so as to accommodate the tank. The tank T is fixed by the bands 10, 10 a. The tank T is fixed to the platform F such that a longitudinal direction is aligned with a horizontal direction. The platform F is an example of a support member that supports the tank T. The tank T stores a hydrogen gas at high pressure. The hydrogen gas stored in the tank T is supplied to a fuel cell (not shown) mounted in the vehicle. The tank T is made of resin and has a cylindrical shape. A valve base V made of metal is provided on one end side of the tank T, and a pipe (not shown) that supplies the hydrogen gas to the fuel cell is connected to the valve base V.

The bands 10, 10a press an upper half of a periphery of the tank T, and are arranged adjacent to each other in the longitudinal direction of the tank T. The bands 10, 10a are both made of metal, and have the same shape. The bands 10, 10a are examples of adjacent first and second bands. Although a rubber sheet (not shown) is interposed between the bands 10, 10a and the tank T, the rubber sheet may not be provided. The band 10 includes a proximal end portion 12 that is fixed to the platform F, a curved portion 11 that extends from the proximal end portion 12 so as to be curved along an outer periphery of the tank T, and a distal end portion 13 that extends from the curved portion 11 in a direction away from the tank T. The platform F includes the recessed portion R, and flat portions H2, H3 that extend in the horizontal direction with the recessed portion R therebetween. The proximal end portion 12 of the band 10 is fixed to the flat portion H2 of the platform F by the fixing mechanism 20. The urging mechanism 30 is fixed to the flat portion H3 of the platform F, and urges the distal end portion 13 of the band 10 toward the platform F. That is, the fixing mechanism 20 and the urging mechanism 30 are located opposite to each other across the tank T.

Similarly, the proximal end portion 12 of the band 10a is fixed to the platform F by the fixing mechanism 20a, and the distal end portion 13 of the band 10a is urged toward the platform F by the urging mechanism 30a. The fixing mechanism 20a is fixed to the flat portion H3 of the platform F, and the urging mechanism 30a is fixed to the flat portion H2 of the platform F. Therefore, the fixing mechanism 20 and the urging mechanism 30 are located opposite to each other across the tank T, and the fixing mechanism 20a and the urging mechanism 30a are also located opposite to each other across the tank T. Also, as shown in FIG. 1, the fixing mechanisms 20, 20a are located opposite to each other across the tank T, and the urging mechanisms 30, 30a are also located opposite to each other across the tank T. The fixing mechanisms 20, 20a have the same shape, the same size, and the same function. Similarly, the urging mechanisms 30, 30a have the same shape, the same size, and the same function.

As shown in FIG. 2, the fixing mechanism 20 includes a bolt 21 and a nut 2N. The bolt 21 of the fixing mechanism 20 passes through a through-hole 12 h formed in the proximal end portion 12 of the band 10, is screwed to a threaded hole h2 formed in the flat portion H2, and is fixed by the nut 2N. Accordingly, the proximal end portion 12 of the band 10 and the platform F are fixed together. Similarly, as shown in FIG. 3, the bolt 21 of the fixing mechanism 20 a passes through the through-hole 12 h formed in the proximal end portion 12 of the band 10 a, is screwed to the threaded hole h2 formed in the flat portion H3, and is fixed by the nut 2N. As described above, the bands 10, 10 a are partially fixed to the platform F by the fixing mechanisms 20, 20 a, respectively. The fixing mechanisms 20, 20 a are examples of a first fixing portion and a second fixing portion that fix fixed portions of the first and second bands to the support member, respectively. Note that the proximal end portions 12 of the bands 10, 10 a are examples of the fixed portions that are fixed to the support member that supports the tank. Means for partially fixing the bands 10, 10 a to the platform F is not limited to the bolt 21 and the nut 2N, and the bands 10, 10 a may be fixed by welding or other methods, for example.

As shown in FIG. 2, the urging mechanism 30 includes a bolt 31, a receiving member 35, an elastic body S, and a nut 3N. The bolt 31 passes through a through-hole 13 h formed in the distal end portion 13 of the band 10, is screwed to a threaded hole h3 formed in the flat portion H3, and is fixed by sandwiching the flat portion H3 of the platform F between a step portion 32 of the bolt 31 and the nut 3N. The receiving member 35 is located between a head portion 33 of the bolt 31 and the distal end portion 13. The bolt 31 passes through the receiving member 35. Since an outer diameter of the head portion 33 is larger than an inner diameter of the receiving member 35, the receiving member 35 is prevented from falling off the bolt 31. A diameter of the through-hole 13 h of the distal end portion 13 of the band 10 is set to be large enough to allow the distal end portion 13 to slide in an axial direction of the bolt 31. While the elastic body S is specifically a coiled spring, the elastic body S is not limited to such a shape. The elastic body S is disposed between the receiving member 35 and the distal end portion 13 of the band 10 with the bolt 31 passing therethrough. The elastic body S thereby urges the distal end portion 13 of the band 10 toward the platform F. Accordingly, the band 10 presses the tank T, and the tank T is fixed to the platform F. As described above, the elastic body S of the urging mechanism 30 urges the distal end portion 13 of the band 10 located at a different position from the proximal end portion 12 of the band 10 fixed to the platform F by the fixing mechanism 20.

As shown in FIG. 3, the urging mechanism 30a similarly includes the bolt 31, the receiving member 35, the elastic body S, and the nut 3N. The bolt 31 is fixed to the flat portion H2. The urging mechanisms 30, 30a are examples of a first urging portion and a second urging portion that urge the first and second bands so as to give pressing forces for the tank to pressing portions of the first and second bands, respectively. Note that the distal end portions 13 of the bands 10, 10a are only urged by the urging mechanisms 30, 30a, respectively, and are not fixed to the platform F.

A reason why the distal end portions 13 of the bands 10, 10a are urged by the urging mechanisms 30, 30a, respectively, as described above is to fix the tank T to the platform F while absorbing a variation in outer dimensions arising from molding accuracy or expansion and contraction of the tank T. If the proximal end portions 12 and the distal end portions 13 of the bands 10, 10a are fixed to the platform F, it may not be possible to absorb the variation in outer dimensions of the tank T, and stably fix the tank T to the platform F.

By urging the bands 10, 10a as described above, the urging mechanisms 30, 30a give pressing forces for pressing the tank T toward the platform to the curved portions 11 of the bands 10, 10a, respectively. The curved portions 11 are examples of the pressing portions that press the outer periphery of the tank toward the support member.

As shown in FIGS. 1, 2, and 3, a direction of the band 10 extending from the proximal end portion 12 to the distal end portion 13 is opposite to a direction of the band 10a extending from the proximal end portion 12 to the distal end portion 13. Thus, an increase in size of the entire fixing apparatus 1 can be suppressed. This point will be described hereinafter in comparison with a fixing apparatus 1x of a comparative example different from the fixing apparatus 1 of the present embodiment.

Figure 4:
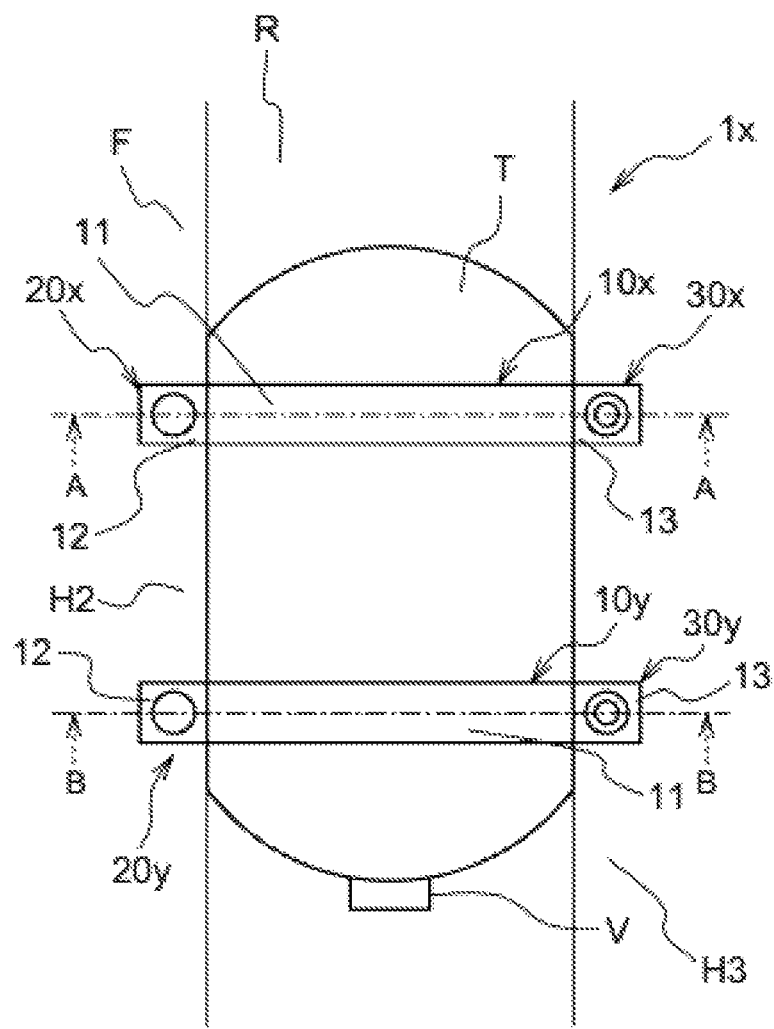
FIG. 4 is an upper view of a fixing apparatus of a comparative example.

FIG. 4 is an upper view of the fixing apparatus 1x of the comparative example. The fixing apparatus 1x fixes the tank T to the platform F by two bands 10x, 10y similarly to the fixing apparatus 1 of the present embodiment. However, fixing mechanisms 20x, 20y are located on the same side with respect to the tank T, which is one side of the tank T, and urging mechanisms 30x, 30y are located on the same side with respect to the tank T, which is the other side of the tank T. Thus, a direction of the band 10x extending from the proximal end portion 12 to the distal end portion 13 is the same as a direction of the band 10y extending from the proximal end portion 12 to the distal end portion 13.

Figure 5:
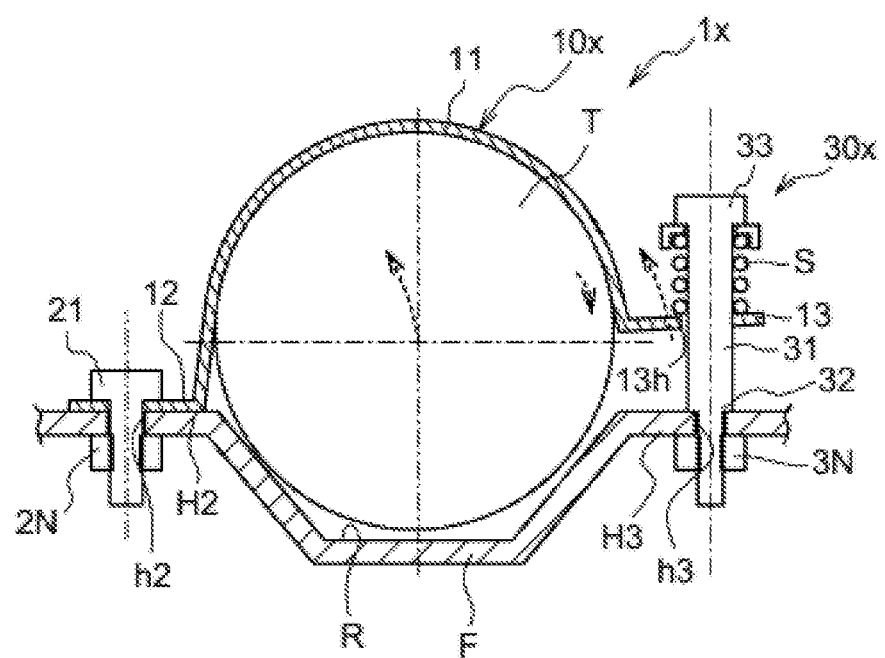
FIG. 5 is an explanatory view of rattling of a tank in the fixing apparatus of the comparative example.

FIG. 5 is an explanatory view of rattling of the tank T in the fixing apparatus 1x of the comparative example. If a force for raising the tank T from the platform F acts on the tank T with vibration, impact or the like applied to the platform F, the band 10x is elastically deformed so as to swing about a base portion of the curved portion 11 on the proximal end portion 12-side, and the distal end portion 13 attempts to be elastically deformed so as to move away from the platform F against an urging force of the elastic body S. This is because the proximal end portion 12 is fixed to the platform F, and the distal end portion 13 is only urged by the elastic body S without being fixed. At this time, a force for rotating the tank T in a direction from the proximal end portion 12 to the distal end portion 13 along an inner surface of the curved portion 11 is also applied to the tank T.

Here, in the fixing apparatus 1x, the direction of the band 10x extending from the proximal end portion 12 to the distal end portion 13 is the same as the direction of the band 10y extending from the proximal end portion 12 to the distal end portion 13 as described above. Thus, the band 10y is also deformed in the same manner as the band 10x. Therefore, when the raising force is applied to the tank T, the bands 10x, 10y attempt to swing in the same direction, and the tank T also attempts to rotate in the same direction along the inner surfaces of the curved portions 11 of the bands 10x, 10y. In order to suppress rattling by inhibiting the tank T from rising, the elastic bodies S of the urging mechanisms 30x, 30y need to have a large urging force. However, an elastic body having a large urging force has a large size. Sizes of peripheral members that hold the elastic body are correspondingly increased, so that sizes and weights of the urging mechanisms 30x, 30y may be increased. Accordingly, a size and a weight of the entire fixing apparatus 1x may be increased, and it may become difficult to ensure a mounting space for the fixing apparatus 1x in the vehicle.

In the fixing apparatus 1 of the present embodiment, the direction of the band 10 extending from the proximal end portion 12 to the distal end portion 13 is opposite to the direction of the band 10a extending from the proximal end portion 12 to the distal end portion 13. Therefore, when the force for raising the tank T is applied, the bands 10, 10a attempt to swing in directions opposite to each other. As a result, a rotational direction of the tank T that attempts to rotate along an inner surface of the curved portion 11 of the band 10 due to the swing of the band 10 and a rotational direction of the tank T that attempts to rotate along an inner surface of the curved portion 11 of the band 10a due to the swing of the band 10a are opposite to each other. Thus, even when the raising force is applied to the tank T, the rotation of the tank T is suppressed. In order that the tank T may rise in a state in which the rotation of the tank T is suppressed as described above, a force exceeding static friction forces generated between the tank T and the curved portion 11 of the band 10 and between the tank T and the curved portion 11 of the band 10a needs to be applied to the tank T to cause the tank T to slide on the curved portions 11. The static friction forces are generated between the tank T, the rotation of which is suppressed, and the bands 10, 10a as described above.

Therefore, as compared with the fixing apparatus 1x in which the static friction forces as described above are not generated, the tank T is inhibited from rising and rattling is suppressed in the fixing apparatus 1 of the present embodiment. It is not necessary for the elastic bodies S of the urging mechanisms 30, 30a to have a large urging force as compared with the case of the fixing apparatus 1x. Thus, the elastic bodies S do not need to have a large size, so that an increase in size and weight of the urging mechanisms 30, 30a is suppressed, and the rattling of the tank T is suppressed. Accordingly, it is possible to fix the tank T in a stable state while suppressing an increase in size and weight of the fixing apparatus 1.

Figure 6:
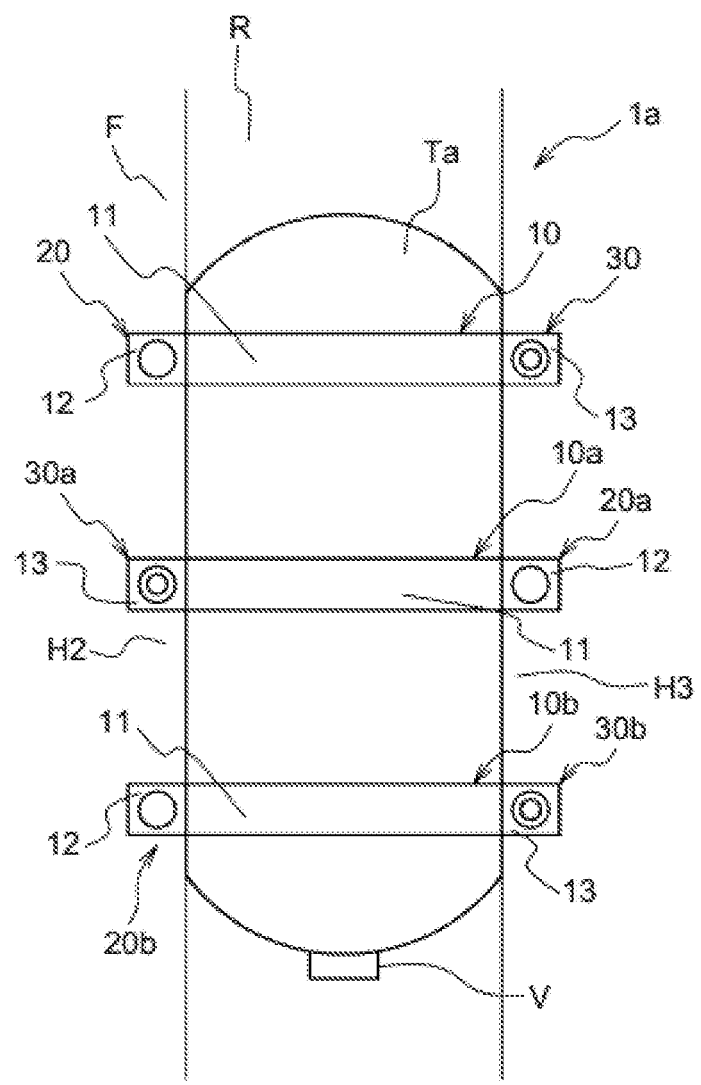
FIG. 6 is an upper view of a fixing apparatus of a second embodiment.

FIG. 6 is an upper view of a fixing apparatus 1a of a second embodiment. Note that the same components as those of the first embodiment are assigned the same reference numerals, and an overlapping description is omitted. The fixing apparatus 1a includes three bands 10 to 10b, three fixing mechanisms 20 to 20b, and three urging mechanisms 30 to 30b. The three bands 10 to 10b fix a tank Ta longer than the above tank T. In this case, the direction of the band 10a extending from the proximal end portion 12 to the distal end portion 13 is also opposite to a direction of the band 10b extending from the proximal end portion 12 to the distal end portion 13. Accordingly, an increase in size of the urging mechanisms 30 to 30b is suppressed, the rattling of the tank T is suppressed, and an increase in size and weight of the fixing apparatus 1a is suppressed.

Figure 7:
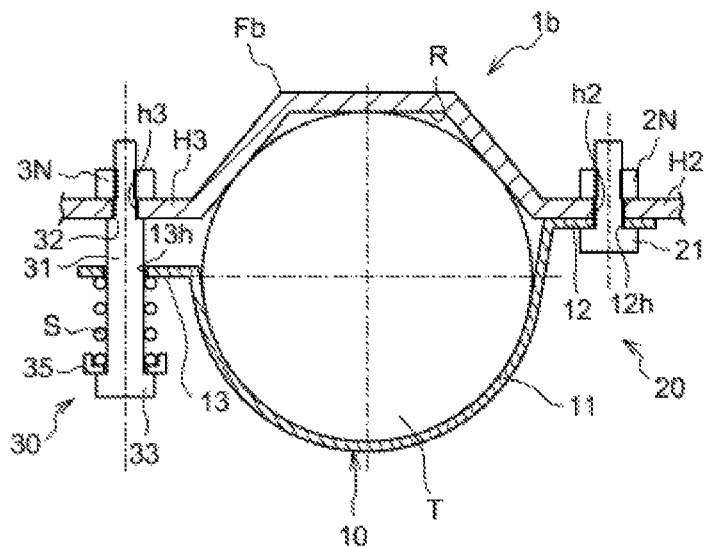
FIG. 7 is a cross-sectional view of a fixing apparatus of a third embodiment.
Figure 8:
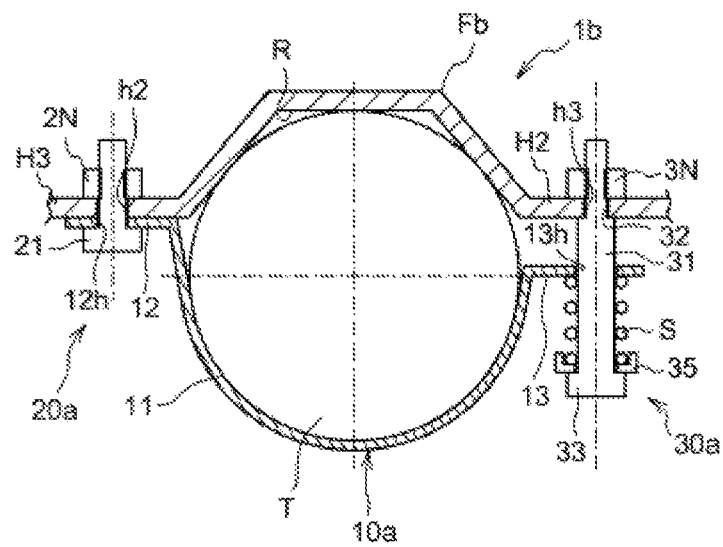
FIG. 8 is a cross-sectional view of the fixing apparatus of the third embodiment.

FIGS. 7, 8 are cross-sectional views of a fixing apparatus 1b of a third embodiment. Note that the same components as those of the first embodiment are assigned the same reference numerals, and an overlapping description is omitted. FIGS. 7, 8 correspond to FIGS. 2, 3, respectively. The fixing apparatus 1b includes the bands 10, 10a, the fixing mechanisms 20, 20a, and the urging mechanisms 30, 30a. The bands 10, 10a are arranged adjacent in the longitudinal direction of the tank T. The bands 10, 10a press a lower half of the periphery of the tank T to fix the tank T to the recessed portion R provided in a lower surface of a platform Fb. The platform Fb supports the tank T between the platform Fb and the bands 10, 10a. In the case of the fixing apparatus 1b, a weight of the tank T is always partly applied to the elastic bodies S of the urging mechanisms 30, 30a. In the fixing apparatus 1b, the direction of the band 10 extending from the proximal end portion 12 to the distal end portion 13 is also opposite to the direction of the band 10a extending from the proximal end portion 12 to the distal end portion 13. Therefore, the rotation of the tank T is suppressed, and the static friction forces are generated between the bands 10, 10a and the tank T. A downward movement of the tank T is thereby suppressed by the bands 10, 10a, so that a load on the elastic bodies S is reduced. Accordingly, the rattling of the tank T is suppressed, and an increase in size and weight of the fixing apparatus 1b is suppressed.

Figure 9:
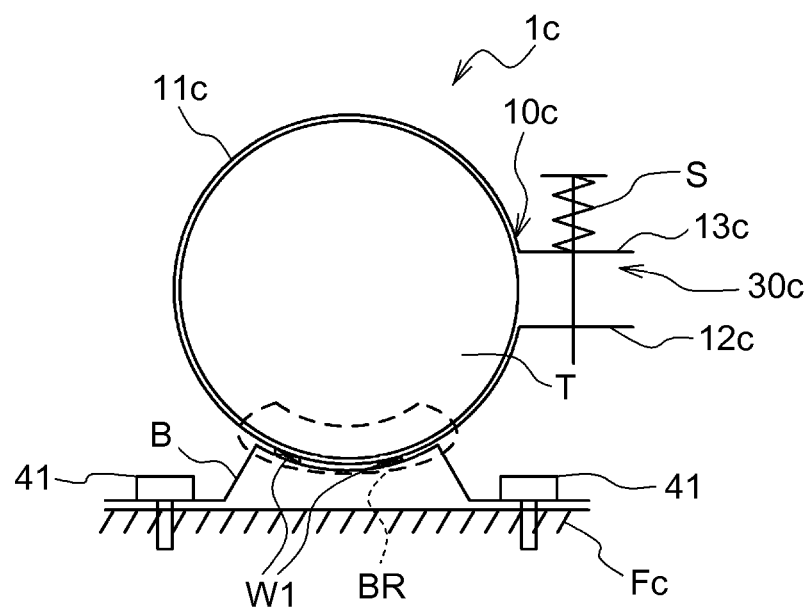
FIG. 9 is a schematic cross-sectional view of a fixing apparatus of a fourth embodiment.
Figure 10:
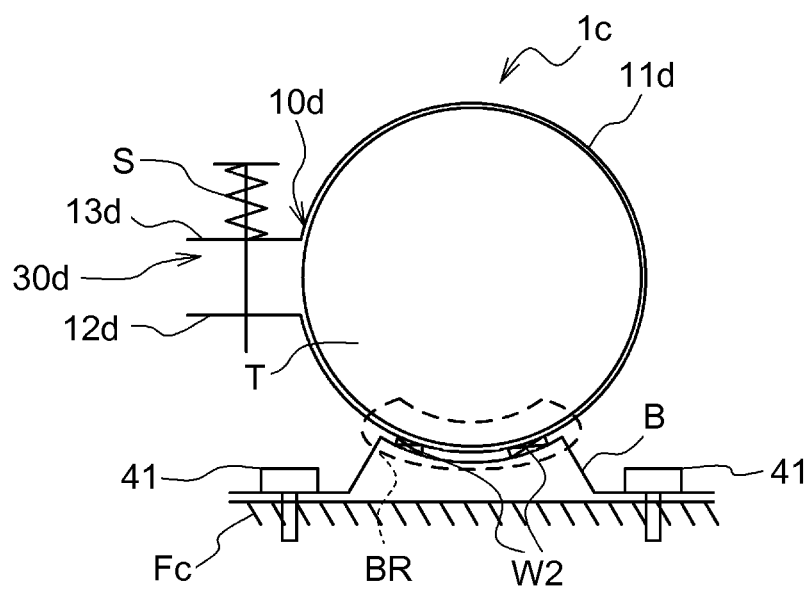
FIG. 10 is a schematic cross-sectional view of the fixing apparatus of the fourth embodiment.

FIGS. 9, 10 are schematic cross-sectional views of a fixing apparatus 1c of a fourth embodiment. Note that the same components as those of the first embodiment are assigned the same reference numerals, and an overlapping description is omitted. FIGS. 9, 10 correspond to FIGS. 2, 3, respectively. The fixing apparatus 1c includes bands 10c, 10d, and urging mechanisms 30c, 30d. A bracket B is fixed onto a platform Fc by bolts 41. The tank T is supported on an arc-shaped portion of the bracket B via the bands 10c, 10d, and the bracket B is supported on the platform Fc. The platform Fc and the bracket B are examples of the support member that supports the tank T. The bands 10c, 10d are arranged adjacent in the longitudinal direction of the tank T, and are wound around substantially the entire outer periphery of the tank T. The bands 10c, 10d are made of metal, and have the same size, the same shape, and the same function.

The band 10c includes a curved portion 11c that is curved along the outer periphery of the tank T, and a proximal end portion 12c and a distal end portion 13c that extend in a linear shape. The curved portion 11c has a facing region BR that is wound around the tank T facing the bracket B. The curved portion 11c is welded to the bracket B at two welding portions W1 in the facing region BR. The band 10c is partially fixed to the bracket B as described above. Note that means for fixing the band 10c and the bracket B is not limited to the welding, and the band 10c and the bracket B may be fixed by using a bolt and a nut. The facing region BR is an example of the fixed portion. The welding portion W1 is an example of the first fixing portion. Here, a length from the facing region BR to the distal end portion 13c is longer than a length from the facing region BR to the proximal end portion 12c. Therefore, it is easier for the band 10c to be elastically deformed in a portion from the facing region BR to the distal end portion 13c than in a portion from the facing region BR to the proximal end portion 12c.

The proximal end portion 12c and the distal end portion 13c extend so as to separate from the tank T facing each other. The distal end portion 13c is urged toward the proximal end portion 12c by the urging mechanism 30c. Accordingly, the band 10c is tightened to press the tank T. Therefore, the curved portion 11c presses the tank T. Here, a region of the curved portion 11c opposite to the bracket B across the tank T, that is, a region of the curved portion 11c on the distal end portion 13c-side presses the tank T toward the bracket B. Therefore, the curved portion 11c is an example of the pressing portion that presses the outer periphery of the tank toward the support member.

Similarly, the band 10d includes a curved portion 11d, a proximal end portion 12d, and a distal end portion 13d. The band 10d is partially fixed to the bracket B by two welding portions W2 in the facing region BR of the curved portion 11d. The facing region BR is an example of the fixed portion. The welding portion W2 is an example of the second fixing portion. The urging mechanism 30d urges the distal end portion 13d toward the proximal end portion 12d. Accordingly, the curved portion 11d of the band 10d presses the tank T. The urging mechanisms 30c, 30d have the same shape, the same size, and the same function.

Here, the facing regions BR of the bands 10c, 10d are located on the same side with respect to the tank T, while the urging mechanisms 30c, 30d are located opposite to each other across the tank T. Also, a direction of the band 10c extending from the facing region BR to the distal end portion 13c is opposite to a direction of the band 10d extending from the facing region BR to the distal end portion 13d.

As shown in FIGS. 9, 10, the distal end portions 13c, 13d of the bands 10c, 10d are urged, but are not fixed. Therefore, when a force for raising the tank T from the bracket B is applied to the tank T, the band 10c attempts to swing about an end of the facing region BR on the distal end portion 13c-side such that the distal end portion 13c separates from the proximal end portion 12c. Similarly, the band 10d attempts to swing such that the distal end portion 13d separates from the proximal end portion 12d.

Here, the direction of the band 10c extending from the facing region BR to the distal end portion 13c is opposite to the direction of the band 10d extending from the facing region BR to the distal end portion 13d as described above. Therefore, the bands 10c, 10d attempt to swing in directions opposite to each other. Accordingly, the rotation of the tank T is suppressed, and the tank T is inhibited from rising according to a principle similar to that described in the first embodiment. In the fixing apparatus 1c of the present embodiment, the rattling of the tank T is suppressed as compared with the case in which the two bands swing in the same direction. Thus, the elastic bodies S do not need to have a large size, so that an increase in size and weight of the urging mechanisms 30c, 30d is suppressed, and the rattling of the tank T is suppressed. Accordingly, an increase in size and weight of the fixing apparatus 1c is suppressed.

Although the embodiments of the invention have been described above in detail, the invention is not limited to the particular embodiments, and various alternatives and modifications may be made without departing from the scope of the invention described in the claims.

The tank is not limited to the resin, and, for example, may be made of metal. The tank is not limited to the cylindrical shape, and may have a prismatic shape, a spherical shape, or other shapes. The tank is not limited to store the hydrogen gas, and, for example, may store a fuel gas such as an LP gas, a liquid fuel, and a gas or a liquid other than the fuel. The number of the bands that press the single tank may be four or more. The tank fixing apparatus can be used for a tank mounted in a moving body other than the vehicle, and can be also used for an indoor or outdoor stationary tank. This is because the stationary tank may receive vibration from, for example, a ground. In the fixing apparatus 1c of the fourth embodiment, the bracket B may be fixed to the lower surface of the platform, and the bands 10c, 10d may be supported by the bracket B.

Although the two urging mechanisms are provided so as to be located opposite to each other across the tank T in the above first to fourth embodiments, the invention is not limited thereto. For example, in the fourth embodiment, the bands 10c, 10d may be fixed to the bracket B at positions slightly shifted from those shown in FIGS. 9, 10, and the urging mechanisms 30c, 30d may be located on the same side with respect to the tank T at an upper right position and an upper left position of the tank T, respectively.

What is claimed is:

1. A tank fixing apparatus, comprising:
a support member configured to support a tank;
a first band and a second band, the first and second bands being adjacent to each other and each including a fixed portion that is fixed to the support member, a pressing portion that extends from the fixed portion and is configured to press an outer periphery of the tank toward the support member, and a distal end portion that extends from the pressing portion and is not fixed to the support member;

a first fixing portion and a second fixing portion, the first and second fixing portions fixing the fixed portions of the first and second bands to the support member, respectively; and a first urging portion and a second urging portion, the first and second urging portions urging the distal end portions of the first and second bands, respectively, in order to give pressing forces to the pressing portions of the first and second bands, respectively, wherein the distal end portion of the first band extends from the pressing portion of the first band in a first direction and the distal end portion of the second band extends from the pressing portion of the second band in a second direction that is opposite to the first direction, wherein the distal end portion of each of the first and second bands is spaced apart from the support member, wherein the first urging portion comprises a first bolt including a first head portion and a first step portion, a first receiving member, a first elastic body, and a first nut, wherein the second urging portion comprises a second bolt including a second head portion and a second step portion, a second receiving member, a second elastic body, and a second nut, wherein the first receiving member does not extend beyond the first head portion of the first bolt in an axial direction of the first bolt away from the support member, wherein a first portion of the support member is sandwiched between the first step portion of the first bolt and the first nut, wherein the second receiving member does not extend beyond the second head portion of the second bolt in an axial direction of the second bolt away from the support member, and wherein a second portion of the support member is sandwiched between the second step portion of the second bolt and the second nut.

2. The tank fixing apparatus according to claim 1, wherein:

the pressing portions of the first and second bands are configured to press the tank between the pressing portions and the support member;

the distal end portions of the first and second bands are configured to be located opposite to each other across the tank;

the fixed portions of the first and second bands are configured to be located opposite to each other across the tank;

the fixed portion and the distal end portion of the first band are configured to be located opposite to each other across the tank; and the fixed portion and the distal end portion of the second band are configured to be located opposite to each other across the tank.

\* \* \* \* \*